Dec. 15, 1964 G. R. SCHULZ 3,161,337
RANDOM STORAGE BIN AND FEEDING DEVICE
Filed March 6, 1961
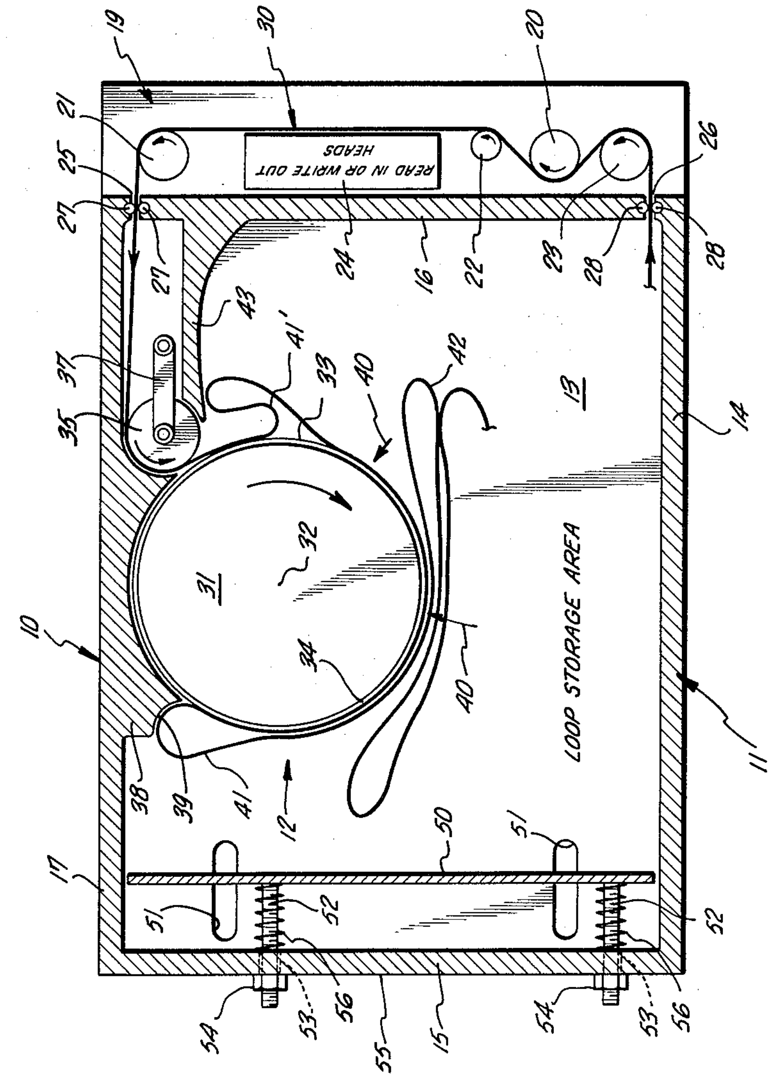
INVENTOR.
GORDON RICHARD SCHULZ
BY
Christie, Parker & Hale
ATTORNEYS.

United States Patent Office 3,161,337
Patented Dec. 15, 1964

3,161,337

RANDOM STORAGE BIN AND FEEDING DEVICE

Gordon R. Schulz, Tujunga, Calif., assignor to Consolidated Electrodynamics Corporation, Pasadena, Calif., a corporation of California Filed Mar. 6, 1961, Ser. No. 93,696
6 Claims. (Cl. 226—118)

This invention relates to tape recording devices. More particularly the invention has utility in those devices which handle closed loop magnetic tapes upon which are recorded information bits in high density. Specifically, the invention relates to the storage bin of the tape machine and to the mechanism by which the tape is fed into the storage bin in a manner such as to assure retention of all information bits recorded on the tape.

There are today many applications where a repeating program is used to control automatically an apparatus such as a lathe, a tracking device, or devices in the advertising field where a message is repeated in a public place. Take recorders of this type are particularly useful in the automation of machinery. In such applications a program is recorded on a continuous loop of magnetic tape with the recorder or the readout head transferring the information from the tape to the slave machine such as a milling machine or a lathe. Also, this type of taped code may be used in computers for programming.

In many instances the length of the loop becomes rather large, so large in fact that it is completely impractical to maintain the loop under tension throughout its length as it passes through its circuit. To reduce the space requirements which such an arrangement would entail there has been developed recently a type of recorder in which the bulk of the tape is coiled loosely in a bin into which it is continuously fed and then removed from the bin to pass the read-out and/or read-in head of the tape recorder. These bins, commonly known as random bins, have had the disadvantage that tape may become creased as it is fed into, stored in, or removed from the storage area. When the informational bits are closely packed on the tape, indicating a high recording density, creasing may cause one or more bits to be deleted such that any logical sequence recorded on the tape is disrupted. The result of such deletion is that the program has to be either rerecorded or corrected, or else the operation dictated and controlled by the logical sequence must be corrected through another agency.

The tape loops formed in the presently constructed storage bins are quite often of an irregular nature, a phenomenon which prevents a high packing density, requires a larger storage space than is necessary, and impairs the life of the tape. Furthermore, the tape frequently bunches at the entrance of the bin such that the volume for storage is not advantageously used. More importantly, the basic disadvantage of the random storage bin as encountered in the art before this invention is that the recording apparatus and storage bin are required to be substantially stationary, with the entrance for the tape required to be over the exit of the tape from the random bin, since the tape has to be oriented and fed into the storage bin by the assistance of gravity. Because of these gravitational limitations, even where devices are located in the bin to assist the feeding operation, the application of such devices has been limited. There is now a demand for the use of such devices in nonstationary structures such as ships, airplanes, and satellite rockets. In applications such as this it is mandatory that the tape be properly fed into the storage bin independently of the force of gravity.

This invention comprises a bin having a tape inlet opening with a tape transport wheel in the bin, which bin may or may not be completely enclosed. A feed roller is located within the bin adjacent to the tape inlet opening and juxtaposed with the transport wheel to guide the tape strip from the tape inlet opening against the periphery of the rotating tape transport wheel. A fixed stop is mounted locally in the bin just adjacent the periphery of the tape transport wheel serving the function of removing one loop from the tape transport wheel so that the next succeeding loop may be formed by the tape transport wheel. In the preferred form of the invention the fixed stop is removed from the feed roller around the periphery of the transport wheel. The circumferential distance around the tape transport wheel from the feed roller to the fixed stop determines the length of the loops, coils, or convolutions stored in the random bin. In actual practice, the random bin of this invention may be fabricated integrally with the tape read-in and/or read-out heads and with the tape drive mechanism of the magnetic tape recorder.

The apparatus of this invention provides a compact, economic, and dependable mechanism for uniformly coiling the bulk of the tape so that the storage volume is efficiently utilized. The tape is handled gently so that, while it is compactly stored, it is not creased. As a result, the useful life of the tape is prolonged.

The following detailed description of the apparatus of this invention may be more clearly understood by reference to the accompanying figure which is a vertical section of the random storage bin of the invention.

The major portion of a recorder 10 is comprised of a random bin tape storage area 11 of this invention with an attendant tape looping apparatus 12. The bin 11 itself is comprised of a back 13, a bottom 14, two side walls 15 and 16, a top 17, and is closed by a front (not shown). The denotation of the enclosing surfaces of the bin 11 as front, back, top, bottom, and sides is for the purpose of illustration only and is not to be considered as a limitation as to the orientation of the recorder and bin combination with respect to spatial reference coordinates.

Extending from one of the sides 16 in the plane of the bin back 13, there is a flange, wall, or a tape deck 19 wherein are mounted a tape drive wheel 20, a plurality of tape idler wheels 21, 22, and 23, and a tape read-in and/or read-out head assembly 24. The tape deck 19 is shown integral with the bin 11 for the purposes of illustration, but the proper practice of this invention does not require such integral construction. A tape inlet opening 25 and a tape outlet 26 are provided to and from the bin 11 in the wall 16 adjacent the bin top 17 and bottom 14, respectively. Each of these openings 25 and 26 is provided with guide rollers 27 and 28, respectively. A tape strip 30 formed into a closed loop having the major portion of its length within the random storage bin 11, is threaded through the tape inlet and outlet openings 25 and 26, around the drive wheel 20 and idler wheels 21, 22 and 23, and past the head assembly 24.

Located within the storage bin 11 is a continuously rotating driven tape transport drum or wheel 31. The interior dimension of the storage bin 11 between the front and back 13 is slightly greater than the width or transverse dimension of the tape loop 30 and the axial dimension of the tape transport wheel 31 is such that it will fit between the bin front cover and the bin back 13 when the axis 32 of the tape transport wheel 31 is perpendicular to the plane of the bin back or base 13 of the recorder 10. The periphery of the transport wheel 31 may include a plastic, composition, or rubber tire 34, the function of which will be described later. A tape feed roller or wheel 35, driven by a belt (not shown) or, alternatively, mounted on a spring-loaded armature 37 biased toward the periphery 33 of the tape transport drum 31 for rotation by the type passing therepast, is located in the bin 11 between the tape transport wheel 31 and the tape inlet opening 25. A fixed post or stop 38 having a concave surface 39 opening opposite the direction of rotation of the tape transport wheel 31 is positioned in the bin 11 opposite the tape feed wheel 35, around the transport wheel 31 in the direction of the transport wheel's rotation. The stop 38 is fixed relative to the axis 32 of the transport wheel 31 and may be fabricated integrally with the back 13 of the bin 11 or the stop 38 may be adjustable relative to the location of the feed roller 35.

The operation of the described apparatus is as follows and is dependent upon the nature and physical properties of the tape 30 stored in the random bin 11. In considering the operation of this recorder 10, it should be borne in mind that the vast bulk of the tape loop 30 is within the tape storage bin 11 with only that portion being read, and the areas of the tape immediately adjacent thereto, being exterior of the bin. The magnetic tape 30 has an inherent spring action or resiliency which, because of the coiling in the random bin 11 in the volume around the transport wheel 31, causes the tape loops adjacent the transport wheel 31 to exert a normal force thereon. The normal force is represented by arrows 40. Because of the normal force 40 against the transport wheel 31, as the tape strip 30 is fed around feed roller 35 against the periphery 33 of transport wheel 31 the normal force causes the strip 30 to be maintained frictionally against the transport wheel; the friction between the tape 30 and the surface 33 of the transport wheel 31 causes the tape 30 to be carried in the direction of rotation of the transport wheel 31. Since there is a tendency for the tape 30 to enter into the main volume of the bin 11 rather than adhere to the surface 33 of the transport wheel 31, the motion of the tape 30 with the rotation of the wheel 31 causes a loop or reverse bend 41 to be formed in the tape 30 just adjacent the feed wheel 35. The normal forces 40 produced by the inherent resilience of the bulk of the tape in the bin 11 cause the loop 41 to proceed with the rotation of the transport wheel 31 until the loop 41 encounters the fixed stop 38 (this is the condition shown in the figure). (It should be remembered that this is a continuous operation.)

When the loop 41 encounters the fixed stop 38, the tape 30 between the post 38 and the feed roller 35 is caused to stop instantaneously relative to the transport wheel 31, but since more tape is being fed against the continuously rotating transport wheel 31 by feed roller 35, a second coil or bend 41′ is now formed adjacent the feed wheel 35. The loop 41 adjacent to the fixed stop 38, once the friction with the transport wheel 31 is broken, breaks away from the periphery 33 of the transport drum 31 and is displaced into the bin 11 as the newly formed loop 41′ continues in the direction of rotation of the transport wheel 31 to the stop 38. The process is repeated when loop or coil 41′ encounters the fixed stop 38. In this manner, coil after coil of the closed length of the tape strip 30 is formed in the random bin 11 to proceed away from the transport wheel 31, ultimately to be withdrawn through slot 26 by action of the drive wheel 20. The coils in bin 11 removed from the transport drum 31 are denoted by the character 42.

It should be realized that the process described above may be carried out by other instrumentalities, for example; a moving belt may be used in lieu of the rotating transport wheel 31 without departing from the scope of this invention.

Because of the nature of the tape 30 to fold back on itself as new loops 40 or 41′ are formed near the feed wheel 35, which "fold-back" phenomenon may foul the feed roller 35, it is often desirable to provide a partition 43 in the random bin 11 extending from the wall 16 to the feed wheel 35 to prevent such fouling. When the recorder 10 is installed with transport wheel 31 at the upper portion of the bin 11 the presence of the partition 43 may be superfluous; however, its presence becomes critical when the recorder 10 is inverted or placed in a horizontal rather than a vertical plane.

A plastic or rubber tire 34 on the transport wheel 31 is often desirable to augment the frictional action between the tape 30 and the drum 31 produced by the normal forces 40.

Since the operation of the tape looping or coiling apparatus 12 is dependent upon the presence of the normal forces 40 and since these forces 40 are in turn dependent upon both the resilient nature of the tape 30 and the amount of volume which the coils 42 in the random bin occupy, it is often desirable to provide that the volume of the bin 11 may be variable to accommodate different lengths of the closed-loop tape strip 30. Variability of volume is very important when the recorder 10 is inverted from the orientation shown in the figure, or when it is placed in a horizontal plane. Accordingly, a partition or false wall 50 is provided in the interior of bin 11 adjacent the wall or side 15 of the bin 11. The partition 50 may be adjustable by means of lugs (not shown) extending through slots 51 in the back 13 and/or front of the bin 11 and held against the exterior of either one of these surfaces by bolts or wing nuts (not shown). Alternatively, as shown in the figure, the partition 50 is provided with threaded studs 52 extending from the partition 50 through apertures 53 in wall 15 of bin 11 to engage nuts 54 on the exterior surface 55 of bin 11. A spring 56 is mounted around each of the studs 52 between the wall 15 and the partition or false wall 50 to assure proper positioning of the partition 50 relative to the wall 15.

In the apparatus discussed above, means are inherently provided for increasing tape life and for preventing the occurrence of other of the problems present in the closed-loop tape recorders known heretofore. The tendency of the tape to crease rather than coil smoothly is removed because the formation of the coils 42 in the tape storage area or bin 11 is a result of the physical properties of the tape itself, and because these loops or coils 42 are formed without the aid of moving fingers or other coiling apparatus.

The adjustability of the volume of the random bin 11 provided by the false wall 50 assures that the normal force 40 against the transport wheel 31 will, in all cases, be of a proper value so that the tape coiling process is no longer dependent upon gravity. This means that the installation of a tape recording means of this type no longer need be on a fixed structure or in a vertical or horizontal installation.

Since the length of the coils 41, 41′, and 42 in the bin 11 are dependent upon the distance around the transport wheel 31 from the feed roller 35 to the fixed stop 38, each coil of the tape 30 in the random bin 11 will be of uniform configuration. This results in a higher packing density being achieved so that the bin 11 volume may be more economically and efficiently utilized. The adjustability of the position of the stop 38 means that the length of the coils 41, 41′, and 42 may be optimized for each recorder installation. There is no practical limit to the width of tape which may be used with the apparatus of this invention.

While there has been described above specific apparatus in the presentation of this invention, it is to be understood that such apparatus is utilized for the purposes of explanation and is not to be considered as a limitation to the scope of this invention.

The invention claimed is:

1. A tape storage apparatus for closed-loop tape elements comprising a bin having a tape inlet opening, means for continuously introducing the tape into the bin through the inlet opening, a tape transport wheel having a periphery in the bin, means for rotating the wheel with a peripheral speed at least as great as the speed at which the tape is introduced into the bin, a tape feed roller in the bin adjacent the inlet opening in juxtaposition to the transport wheel for introducing tape introduced into the bin into contact with the periphery of the wheel, and a fixed tape loop stop element positioned in juxtaposition to the transport wheel, the bin having a restricted internal volume so that tape in the bin reacts against the bin to urge the introduced tape into contact with the transport wheel between the tape feed roller and the tape stop element.

2. A tape storage apparatus according to claim 1 wherein the stop element includes a concave surface opening against the direction of rotation of the tape transport wheel.

3. A tape storage apparatus according to claim 1 wherein the tape transport wheel includes a plastic tire around its periphery.

4. A tape storage apparatus according to claim 1 including a movable partition in the bin whereby the volume of the bin is variable.

5. In a closed-loop tape recording apparatus comprising: a tape drive wheel, at least one tape idler wheel, at least one magnetic reading head, and an enclosed tape storage bin, the improvement comprising: said tape storage bin having a depth transversely of the tape approximating the width of the tape stored therein and having spaced tape inlet and outlet openings, the tape being introduced at constant speed into the bin through the inlet opening from the drive wheel, a tape transport wheel having a peripheral surface in the bin having the axis thereof disposed transversely of the depth of the bin, means for rotating the wheel at a constant speed at least as great at the periphery thereof as the speed at which the tape passes the inlet opening, a feed roller in the bin adjacent the transport wheel adjacent the tape inlet opening for guiding the tape against the surface of the transport wheel, and a loop forming stop fixed relative to the wheel in the bin adjacent the transport wheel across the transport wheel from the feed roller, the bin having a restricted internal volume with the portion of the closed-loop of tape in the bin reacting against the bin to urge the tape passing the feed roller into contact with the transport wheel.

6. A random tape storage bin and tape looping apparatus for handing and storing a portion of a closed loop of tape, the apparatus comprising:

(*a*) a random storage bin having
 (1) a depth slightly greater than the width of the tape,
 (2) a tape inlet opening, and
 (3) a restricted internal volume confining the tape therein so that the tape reacts against the bin through inherent resiliency of the tape, (*b*) a continuous tape transport surface disposed adjacent the tape inlet opening in the bin transversely of the depth of the bin, (*c*) means for continuously moving the tape transport surface at constant speed, (*d*) guide means in the bin adjacent the tape inlet opening for continuously introducing a first portion of the tape entering the bin into contact with the tape transport surface,
 (1) the tape in the bin being looped upon itself and exerting a normal force on the transport surface to urge the first portion of the tape into frictional engagement with the transport surface over the length of the tape first portion,
 (2) the tape first portion moving with the transport surface away from the tape inlet opening,
 (3) the closed loop of tape having
  (i) a second portion immediately adjacent the first portion opposite from the tape inlet opening,
   the second portion of the tape extending into the bin away from the transport surface to form a first loop in the tape between the tape first and second portion, and
  (ii) a third portion immediately adjacent the first portion and adjacent the tape inlet opening, (*e*) tape loop stop means in the bin juxtaposed to the transport surface at a location spaced apart from the guide means for engaging the first loop and for stopping movement of the first loop to stop movement of the tape first portion with the transport surface,
 (i) stoppage of movement of the tape first portion forming a second loop in the tape between the tape first and third portions as the tape is continuously introduced into contact with the transport surface,
 (ii) the second loop moving toward the tape loop stop means to displace the tape first portion away from the transport surface into the bin.

References Cited in the file of this patent

UNITED STATES PATENTS

| | | |
|---|---|---|
| 612,926 | Harris | Oct. 25, 1898 |
| 987,752 | Short et al. | Mar. 28, 1911 |
| 1,525,939 | Holmes | Feb. 10, 1925 |
| 2,287,768 | Eckstein | June 30, 1942 |
| 2,338,143 | Taylersen | Jan. 4, 1944 |
| 2,395,305 | Vincent et al. | Feb. 19, 1946 |
| 2,499,700 | Tinkham et al. | Mar. 7, 1950 |
| 2,731,262 | Morrow | Jan. 17, 1956 |
| 2,852,252 | Sperry | Sept. 16, 1958 |
| 3,078,023 | Hecker | Feb. 19, 1963 |

FOREIGN PATENTS

| | | |
|---|---|---|
| 58,721 | France | Nov. 4, 1953 |
| | (2nd Addition of 964,735) | |